United States Patent
Ozdemir et al.

(10) Patent No.: US 9,310,502 B2
(45) Date of Patent: Apr. 12, 2016

(54) METHOD OF REPRESENTING SEISMIC SIGNALS

(75) Inventors: Ahmet Kemal Ozdemir, Asker (TR); Ali Ozbek, Milton (GB)

(73) Assignee: WesternGeco L.L.C., Houston, TX (US)

( * ) Notice: Subject to any disclaimer, the term of this patent is extended or adjusted under 35 U.S.C. 154(b) by 715 days.

(21) Appl. No.: 12/602,816

(22) PCT Filed: Jun. 6, 2008

(86) PCT No.: PCT/GB2008/001940
§ 371 (c)(1),
(2), (4) Date: Apr. 27, 2010

(87) PCT Pub. No.: WO2008/152364
PCT Pub. Date: Dec. 18, 2008

(65) Prior Publication Data
US 2010/0211323 A1    Aug. 19, 2010

(30) Foreign Application Priority Data
Jun. 13, 2007  (GB) .................................. 0711404.4

(51) Int. Cl.
*G01V 1/48* (2006.01)
*G01V 1/36* (2006.01)
*G01V 1/28* (2006.01)

(52) U.S. Cl.
CPC .. *G01V 1/36* (2013.01); *G01V 1/28* (2013.01); *G01V 1/282* (2013.01); *G01V 2210/57* (2013.01); *G01V 2210/66* (2013.01)

(58) Field of Classification Search
USPC ................ 702/15, 16, 17, 18; 367/47, 48, 49
See application file for complete search history.

(56) References Cited

U.S. PATENT DOCUMENTS

| | | | |
|---|---|---|---|
| 3,689,874 A | | 9/1972 | Foster et al. |
| 4,922,465 A | | 5/1990 | Pieprzak et al. |
| 5,060,202 A | * | 10/1991 | Meek et al. ..................... 367/45 |
| 5,444,619 A | * | 8/1995 | Hoskins et al. ................. 702/13 |

(Continued)

FOREIGN PATENT DOCUMENTS

| | | |
|---|---|---|
| GB | 2256048 A | 11/1992 |
| GB | 2282665 A | 4/1995 |

(Continued)

OTHER PUBLICATIONS

Zhang: "Interpolation and Fourier transform of irregularly sampled data", Stanford Exploration Project, Report 72, Dec. 18, 1997, pp. 77-83.*

(Continued)

*Primary Examiner* — Paul D Lee
(74) *Attorney, Agent, or Firm* — Steven A. Gahlings

(57) ABSTRACT

There is provided a method of interpolating wave signals, particularly seismic signals acquired through a seismic survey, using the steps of obtaining time series of measured wave signals; and selecting iteratively basis functions to represent said measured signals with a basis function being fully defined by n parameters, wherein in each iteration one or more basis functions are combined with the selected basis functions such that the residual between the measured signals and a representation of the measured signal by the combined basis functions is minimized at the locations of the measurement at each iteration.

20 Claims, 4 Drawing Sheets

(56) References Cited

U.S. PATENT DOCUMENTS

| | | | |
|---|---|---|---|
| 6,094,620 A * | 7/2000 | Gasparotto et al. | 702/14 |
| 6,502,037 B1 * | 12/2002 | Jorgensen et al. | 702/14 |
| 6,522,974 B2 * | 2/2003 | Sitton | 702/17 |
| 6,775,618 B1 | 8/2004 | Robertsson et al. | |
| 7,068,568 B2 | 6/2006 | Robertsson | |
| 7,120,541 B2 * | 10/2006 | Wang | 702/11 |
| 7,715,988 B2 | 5/2010 | Robertsson et al. | |
| 7,835,719 B1 | 11/2010 | Francis et al. | |
| 8,185,316 B2 * | 5/2012 | Alam et al. | 702/14 |
| 2004/0172199 A1 * | 9/2004 | Chavarria et al. | 702/14 |
| 2005/0197781 A1 * | 9/2005 | Harmon et al. | 702/14 |
| 2008/0089174 A1 | 4/2008 | Sollner et al. | |
| 2008/0119701 A1 * | 5/2008 | Milner et al. | 600/342 |
| 2010/0329077 A1 | 12/2010 | Ozbek et al. | |

FOREIGN PATENT DOCUMENTS

| | | | |
|---|---|---|---|
| GB | 2395559 A | 5/2004 | |
| GB | 2414299 A | 11/2005 | |
| WO | 2005062196 A2 | 7/2005 | |
| WO | WO 2005062196 A2 * | 7/2005 | G06F 17/17 |
| WO | 2005114258 A1 | 12/2005 | |
| WO | 2005062196 A3 | 6/2006 | |

OTHER PUBLICATIONS

Abma et al: "3D interpolation of irregular data with a POCS algorithm", Geophysics, vol. 71, No. 6, 2006, pp. E91-E97.

Butzer et al: "An introduction to sampling analysis", Nonuniform sampling: theory and practice, edited by Farokh Marvasti, Kluwer Academic/Plenum Publishers, New York, 2001, chapter 2, pp. 17-121.

Duijndam et al: "Irregular and sparse sampling in exploration seismology", Nonuniform sampling: theory and practice, edited by Farokh Marvasti, Kluwer Academic/Plenum Publishers, New York, 2001, chapter 11, pp. 479-518.

Etemoglu et al: "Speech coding with an analysis-by-synthesis sinusoidal model", Acoustics, Speech and Signal Processing, vol. 3, 2000, pp. 1371-1374.

Hale: "Resampling irregularly sampled data", Stanford Exploration Project, Sep. 25, 1980, pp. 39-57.

Liu et al: "Reconstruction of seismic data using adaptive regularization", Proceedings of the SPIE, The International Society for Optical Engineering, vol. 4792, 2002, pp. 114-124.

Liu et al: "Minimum weighted norm interpolation of seismic records", Geophysics, vol. 69, No. 6, 2004, pp. 1560-1568.

Mallat et al: "Matching pursuits with time-frequency dictionaries", IEEE Transactions on Signal Processing, vol. 41, No. 12, 1993 pp. 3397-3415.

Robertsson et al: "Rough-sea deghosting using a single streamer and a pressure gradient approximation", Geophysics, vol. 67, No. 6, 2002, pp. 2005-2011.

Xu et al: "Antileakage Fourier transform for seismic data regularization", Geophysics, vol. 70, No. 4, 2005, pp. V87-V95.

Yen: "On nonuniform sampling of bandwidth-limited signals", IRE Transactions on Circuit Theory, CT-3, 1956, pp. 251-257.

Zwartjes et al: "Fourier reconstruction of non-uniformly sampled, aliased data", SEG International Exposition and 74th Annual Meeting, Denver, Colorado, Oct. 10-15, 2004.

Combined Search and Examination Report of British Application No. GB 0711404.4 dated Oct. 15, 2007.

International Search Report of international application No. PCT/GB2008/001940 dated Oct. 9, 2008.

* cited by examiner

METHOD OF REPRESENTING SEISMIC SIGNALS

The present invention relates to methods for representing or interpolating spatially or temporally sampled signals, particularly irregularly sampled wave signals such as seismic signals.

BACKGROUND OF THE INVENTION

The aim of exploration seismology is to obtain an image of the subsurface by probing it with seismic waves at various locations. These waves are generally generated by using airguns in marine seismics, and vibroseis or dynamite in land seismics. The waves propagate downwards through the subsurface, and are reflected at interfaces between geological layers or refracted within layers. Parts of these waves subsequently propagate upwards to the surface, where they are detected and recorded.

In exploration seismology, although the time coordinate is regularly sampled, spatial coordinates are typically irregularly sampled due to the presence of obstacles in land and strong currents in marine. But even receivers placed for example within a marine survey cable or streamer may not be always equidistant. Hence, the inline sampling in direction of the cable can be quite irregular.

The interpolation on regular grid points or regularization of seismic signals or data is very important, particularly for uses in time-lapse survey matching, multiple suppression and imaging. If the irregular nature of the sampling grid is ignored or handled poorly, notable errors are introduced, the severity of which may be further amplified at later stages of the seismic processing chain.

The problem of signal reconstruction from uniformly spaced data has been investigated in depth.

The Whittaker-Kotel'nikov-Shannon sampling theorem states that any signal f(x) can be reconstructed from its uniformly spaced samples, if the sampling interval is less than half the period of the highest spectral component in that signal. Thus if f(x) is bandlimited to the wavenumber $\sigma/2$, which is known as the Nyquist wavenumber, then the sampling theorem provides the following formula to interpolate any function value from uniformly spaced values $k(m/\sigma)$:

$$f(x) = \sum_{m=-\infty}^{\infty} f(m/\sigma)\mathrm{sinc}(\sigma x - m) \qquad (1)$$

where $\sin c(x)=\sin(\pi x)/(\pi x)$. Thus, when the sampling rate is sufficient and there is no aliasing, the sampling theorem provides a way to reconstruct the signal "exactly" from its samples uniformly spaced samples. To satisfy requirements of the sampling theorem, the signal should be sampled at a rate greater than twice the Nyquist rate, i.e., $\sigma$.

Moreover, if the signal is space limited, i.e. the signal has only negligible amount of energy outside an interval $[0, (L-1)/\sigma]$, the infinite summation in Whittaker-Kotel'nikov-Shannon sampling theorem can be replaced with a finite summation:

$$f(x) = \sum_{m=0}^{L-1} f(m/\sigma)\mathrm{sinc}(\sigma x - m). \qquad (2)$$

A feature of the sampling theorem is that, the infinite summation given in (1) is uniformly convergent in x. This allows a user to differentiate the expression of eq. (1) term-by-term and derive the reconstruction theorems for derivatives of f(x). The general formula for $r^{th}$ derivative is:

$$f^{(r)}(x) = \sum_{m=-\infty}^{\infty} f(m/\sigma)\frac{d^r}{dx^r}\mathrm{sinc}(\sigma x - m). \qquad (3)$$

For the first derivative, r=1, this leads to the following interpolation formula:

$$f'(x) = \sum_{m=-\infty}^{\infty} \sigma f(m/\sigma)\left\{\frac{\cos(\pi(\sigma x - m))}{\sigma x - m} - \frac{\sin(\pi(\sigma x - m))}{\pi(\sigma x - m)^2}\right\}. \qquad (4)$$

In applications where samples of the function and its higher order derivatives are available simultaneously, the required sampling rate for exact reconstruction can be reduced. For instance, in the simplest case where multichannel data consist of both data and the corresponding first order derivative (gradient) it is possible to reconstruct the continuous signal from samples recorded at Nyquist rate (rather than twice the Nyquist rate) by using the following:

$$f(x) = \sum_{m=-\infty}^{\infty} \left\{ \begin{array}{c} f(2m/\sigma) + \\ (x - 2m/\sigma)f'(2m/\sigma) \end{array} \right\} \mathrm{sinc}^2(\sigma x/2 - m). \qquad (5)$$

The relation (5) is known as multi-channel sampling theorem.

In other words, to reconstruct the continuous signal it is sufficient to know either signal samples $f(m/\sigma)$ at twice the Nyquist rate or signal and gradient samples $f(2 m/\sigma)$ and $f'(2 m/\sigma)$, respectively, at the Nyquist rate. Also, it is interesting to note that in the multichannel sampling theorem the sin c function is squared. There exists a corresponding version of the multichannel sampling theorem for cases when samples of both signal and its Hilbert transform are available.

By definition, a signal bandlimited to $\sigma/2$ does not have any spectral components above the wavenumber $\sigma/2$. Therefore filtering such a signal with an ideal low-pass filter with a cut off wavenumber of $\sigma/2$ does not change its spectral content. Hence the following identity holds:

$$f(x) = f(x) * \sigma\mathrm{sinc}(\sigma x) \qquad (6)$$

$$= \sigma \int_{-\infty}^{\infty} f(\tau)\mathrm{sinc}(\sigma(x-\tau))d\tau,$$

where '*' denotes the convolution operator and $\sigma \sin c(\sigma x)$ is an ideal low-pass filter with a cut off wavenumber of $\sigma/2$. The Riemann sum approximation to this integral identity yields the following approximation, which is known as the sin c interpolator:

$$f(x) \approx f_L(x) = \sigma \sum_{m=0}^{L-1} \Delta x_m f(x_m) \mathrm{sinc}(\sigma(x - x_m)), \quad (7)$$

where $\Delta x_m$ is the Jacobian weight, i.e., $\Delta x_m = x_{m+1} - x_m$, and $f(x_m)$ is the value of the seismic data at irregular offset $x_m$. It is important to note that, when $\Delta x_m = 1/\sigma$, the sin c interpolator is exact since $$f(x) = \sum_{m=-\infty}^{\infty} f(m/\sigma) \mathrm{sinc}(\sigma(x - \tau)) \quad (8)$$

by Whittaker-Kotel'nikov-Shannon theorem. On the other hand, when $\Delta x_m \neq 1/\sigma$, the sin c interpolator provides only a crude approximation to the continuous signal. In this case, a better approach would be to invert (2) for the desired uniformly spaced signal values $f(m/\sigma)$.

By using the matrix notation the equation (7) can be written as $$h = \begin{bmatrix} f(x_1) \\ f(x_2) \\ \vdots \\ f(x_L) \end{bmatrix} \approx \begin{bmatrix} s_{11} & s_{12} & \cdots & s_{1L} \\ s_{21} & s_{22} & \cdots & s_{2L} \\ \vdots & \vdots & \ddots & \vdots \\ s_{L1} & s_{L2} & \cdots & s_{LL} \end{bmatrix} \cdot \begin{bmatrix} f(0) \\ f(1/\sigma) \\ \vdots \\ f((L-1)/\sigma) \end{bmatrix} = Sg, \quad (9)$$

where $\sigma/2$ is the bandwidth of the signal $f(x)$ and S is the sin c matrix with entries $s_{ij}=\mathrm{sin\,c}(\sigma(x_i-j/\sigma))$. If the matrix S is well conditioned than the seismic data at regular offsets can be computed by standard matrix inversion:

$$g = S^{-1}h. \quad (10)$$

Otherwise, a least squares minimum norm inversion should be preferred:

$$g = (S^T W_1 S + W_2)^{-1} S^T W_1 h, \quad (11)$$

where $W_1$ usually chosen as a diagonal matrix whose $m^{th}$ diagonal entry is the Jacobian weight $\Delta x_m = x_{m+1} - x_m$ and $W_2$ is usually chosen as a small multiple of identity matrix, i.e., $W_2 = \epsilon^2 I$.

An interpolator in accordance with equation (11) has been described in: Yen J. L., 1956, On non-uniform sampling of bandwidth-limited signals, IRE Trans. Circuit Theory, CT-3, 251-257 (1956). It is therefore sometimes referred to as Yen's Interpolator of Type 1.

Many known interpolators used in seismics are variations of the Yen's interpolator.

The interpolators based on Yen's $1^{st}$ theorem usually provide satisfactory results on non-aliased signals with little high-wavenumber content. However their performance degrades significantly when the interpolated signal has a substantial amount of high wavenumber spectral content.

Another shortcoming of the interpolators based on Yen's $1^{st}$ theorem is that in order to solve equation (9), in general at least as many irregular sampling positions as regular sampling positions are required. Hence, if some seismic traces are dropped out, traces which reside at further locations must be used to solve the system of equations given by eq. (9). Usually this degrades the accuracy of the interpolated sample values.

Further, although Yen's $1^{st}$ interpolator is exact for infinite length signals, it is an approximation when only a finite extent of the signal is available for interpolation.

The interpolation as discussed so far are non-adaptive techniques, where a block of irregular input data is interpolated to determine a block of regular output data. Once the matrix or in general the regularization kernel is computed, the same kernel can be used on all data recorded with the same sampling grid. Therefore these methods provide a fast solution when many recordings with the same irregularity are to be regularized. On the other hand, the existence of even a few aliased spectral components in the input data introduces large regularization errors. Hence, the non-adaptive techniques usually have no means to overcome aliasing without additional measurements.

One of the recently developed techniques to overcome the limitations of the non-iterative interpolation algorithm is the anti leakage Fourier transformation (ALFT), described for example by Sheng Xu et. al in: Geophysics Vol. 70, No. 4 (July-August 2005), P. V87-V95. The ALFT approach to seismic interpolation begins with the spatial discrete Fourier transformation of the seismic traces usually in the FX domain. To this purpose the non-uniform Fourier transformation is used, which is basically a Riemann summation approximation to the continuous-space Fourier transformation. In the second step of the ALFT, the most energetic spectral component of the non-uniform Fourier transformation is detected and the corresponding sinusoidal space domain signal is computed on the irregular grid by using inverse Fourier transformation. Assuming that the frequency and amplitude of the most energetic spectral component are accurately estimated, the estimated sinusoidal signal is then subtracted from the input data to prepare the input for the next iteration. Hence, the steps of ALFT can be summarized as:

1. Non-uniform Fourier transform $$G(k) = \sum_{m=1}^{L} \Delta x_m g(x_m) e^{-j2\pi k x_m}$$

2. Find dominant spectral component $$k^* = \underset{k}{\mathrm{argmax}} |G(k)|$$

3. First order signal estimate $$\hat{g}^{k^*}(y) = \Delta k G(k^*) e^{j2\pi k^* y}$$

4. Compute residual $g(x_m) = g(x_m) - \hat{g}^{k^*}(x_m)$ and iterate

However the known ALFT method is found to have a very slow convergence rate. Further the method is not immediately suited to handle multichannel data, for example data which include gradient measurements.

Given the problems of the existing interpolators it remains an object to find improved interpolators capable of interpolating data received by receivers at irregular locations to regular sampling locations.

SUMMARY OF THE INVENTION

In this invention, there is provided a method of representing signals, preferably wave signals and more preferably seismic signals acquired through a seismic survey, using the steps of obtaining the signals as measured or registered at discrete points spread in space and/or time; iteratively selecting basis functions to represent said time signal with a basis function being fully defined by n parameters, wherein in each iteration one or more basis functions are selected and combined with the previously selected basis functions such that the residual between the measured signals and a representation of the measured signal by the combined basis functions is minimized at said points at each iteration.

The step of representing a signal is understood as replacing the measured signal by a defined mathematical function which allows the user to calculate a signal value at any point or time between locations or times of the measurements. The perhaps best known example of such a representation is the above mentioned Fourier transform which seeks to replace a set of measured data by a family of sinusoids. However in contrast to methods like the Fourier transform the present method works iteratively and on irregularly sampled data. It also works on any given set of basis functions which can be completely described or defined in a mathematical sense by n parameters. In contrast to for example the ALFT method, the minimizing is done at each of the potentially irregularly spaced points or locations, at which the signals have been registered or measured.

The n parameters can be any number equal or larger than 1. In the case of sinusoids for example n equals three, namely the frequency or wavenumber, the amplitude and the phase of the sinus function. However the number of parameters characterizing one function can be larger or smaller than three.

The functions used to represent the measured signals can be any set of functions which in combination can be adapted to any measurable wave signal. In the literature there are many examples of other potential basis functions to represent wave signals. Among those examples are the wavelets which may be even better suited to represent seismic signals than sinusoids. Examples of suitable families of functions are the known sets of orthogonal or non-orthogonal functions such as sinusoids, such as sinusoids; chirplets of the form $\exp(j2\pi(ax^2+bx+c))$, where a is the chirp rate, b is the frequency and c is the phase; wavelets of the form $\psi((x-\tau)/s)/\sqrt{s}$ where s is the scale parameter, z is the shift parameter and $\psi(x)$ is the mother wavelet function; curvelets of the form $\gamma_{ab\theta}(r,w)=\gamma_{a00}(R_\theta(x-b))$, where (r,w) are the polar Fourier coordinates, $R_\theta$ is the 2-by-2 rotation matrix effecting planar rotation by $\theta\in(-\pi/\pi)$ radians, a>0 is the scale, $b\in R^2$ is the location parameters, and $\hat{\gamma}_{a00}(r,w)$ is the generating function which is defined in the polar coordinates by $\hat{\gamma}_{a00}(r,w)=W(ar)V(w/\sqrt{a})a^{3/4}$ in terms of the admissible windows W(r) and V(w); gabor functions of the form $2^{1/4}\exp(-\pi(x/X-m)^2+j2\pi kx/X)$, where k,m are integers and X is a constant scale factor; or seislets.

The invention is however not limited to the above group of possible basis functions and their respective parameters. Many more basis function developed for general or specific signals are known and readily available in the literature.

Whilst the selection of a particular suited family or library of basis function depends on the nature of the measured signals, it is a common feature of these functions to be characterized by a set of parameters. And it is hence an aspect of the present invention to select iteratively new sets of optimized parameters such that at each iteration one new basis function is identified.

The optimization takes into account the difference of the combination of selected basis function with the measured signals at the time or location of the measurements. The principle behind this form of optimization is known as "Matching Pursuit".

In a preferred embodiment of the invention each of said n parameters is selected through an optimization process.

The optimization does not make use of the relative distance between points as such, whereas for example the known ALFT method uses the relative distance between sampling points in the non-uniform Fourier-transform stage of the process.

In an even more preferred embodiment the functions are selected by simultaneously optimizing function parameters, such as amplitude, phase and frequency through the optimization of one parameter.

In a variant of this embodiment, in each iteration one or more basis functions are combined with the previously selected functions such that the residual between the measured wave signals and a representation of the measured wave signal by the combined functions is minimized with the functions being selected by determining one or more maxima in the Lomb spectrum of the residual.

The new technique is iterative. Preferably, at each iteration step one or more functions are selected using the Lomb spectrum to be combined with the functions selected at previous iterations to form a more accurate representation of the measured signals.

In a preferred embodiment the wave signals represent energy traveled through layers of the earth, in particular seismic signals. The method is however in principle applicable to any form of sampled wave signal in order to interpolate, extrapolate or otherwise represent the signals measured at regular or irregular spatial or time intervals.

However, in a preferred embodiment of the invention the highest frequency of the wave signals is below 500 Hz. In this frequency range the Nyquist theorem favors a relatively low sampling rate. In a variant, the signal can be filtered to be bandlimited to a frequency content between 0 and 500 Hz.

In a further preferred embodiment the signal can be split according to frequency bands and processed separately in accordance with the inventive methods in each frequency band. This variant of the invention has the advantage that a different optimized spatial bandwidth can be applied within each frequency band. The spatial bandwidth or wavenumber range, in case where the signal is transformed from the spatial into the wavenumber domain, is preferably determined by the speed of propagation of the wave signals.

With the knowledge of the basis functions which represent the data a corresponding spectrum can be directly derived. Preferred spectra are the phase and amplitude spectra which can be for example directly read from the representation of the signals using sinusoids.

In a further preferred embodiment the methods of the present invention are extended to make use of multichannel data such as spatial gradient data, higher order spatial gradients or Hilbert transformed date and the like. In combining the equations for signal $f(x_k)$ and its gradient $f'(x_k)$, a weighting factor can be used to account for difference in units.

The above method is applicable to so-called 1D, 2D or 3D signals, thus denoting the spatial distribution of the measuring locations of the signal.

BRIEF DESCRIPTION OF THE DRAWINGS

The present invention will become more fully understood from the detailed description and the accompanying drawings, wherein.

DETAILED DESCRIPTION AND EXAMPLES

In the following description, for the purposes of explanation, the background, a basic example of this invention and various preferred embodiments of the basic example are set forth in order to provide a thorough understanding of the invention. However, it will be apparent that the invention may be practiced without these specific details.

Figure 2A:
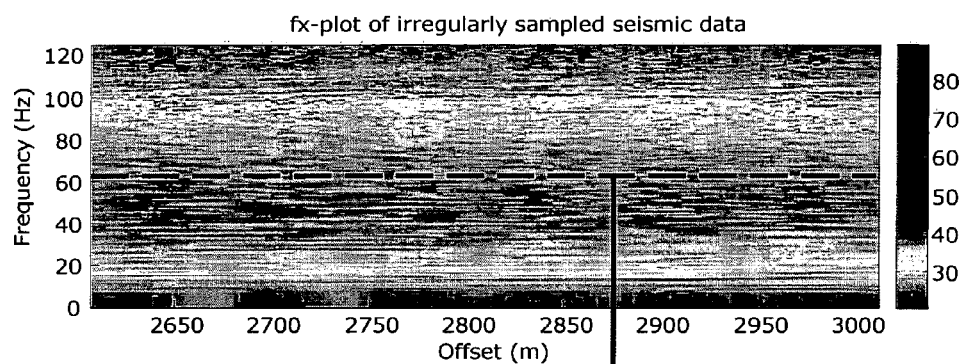
FIGS. 2A-C illustrate an application of the method in the frequency-space or f,x-domain.
Figure 2B:
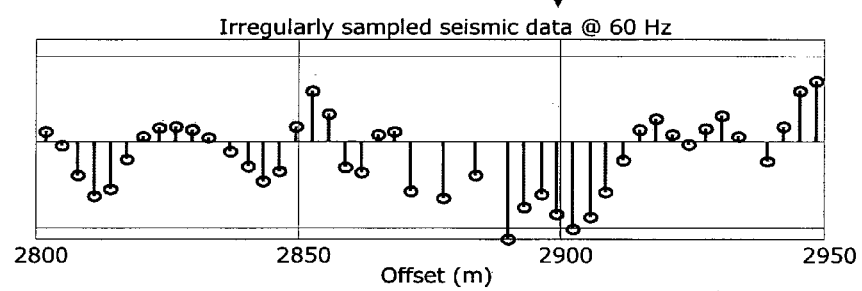
Figure 2C:
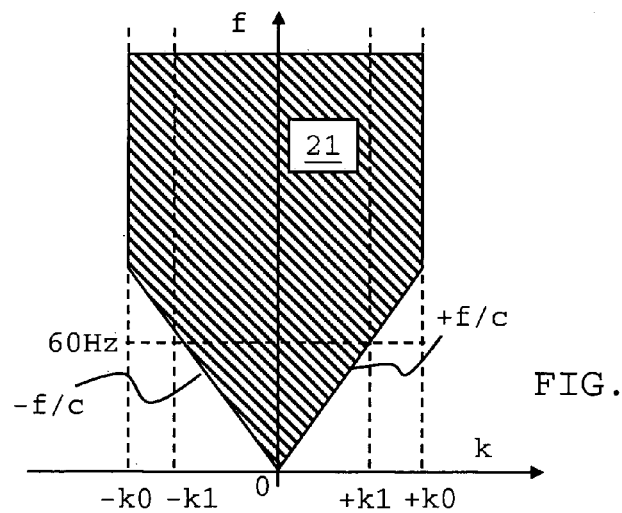
Figure 3:
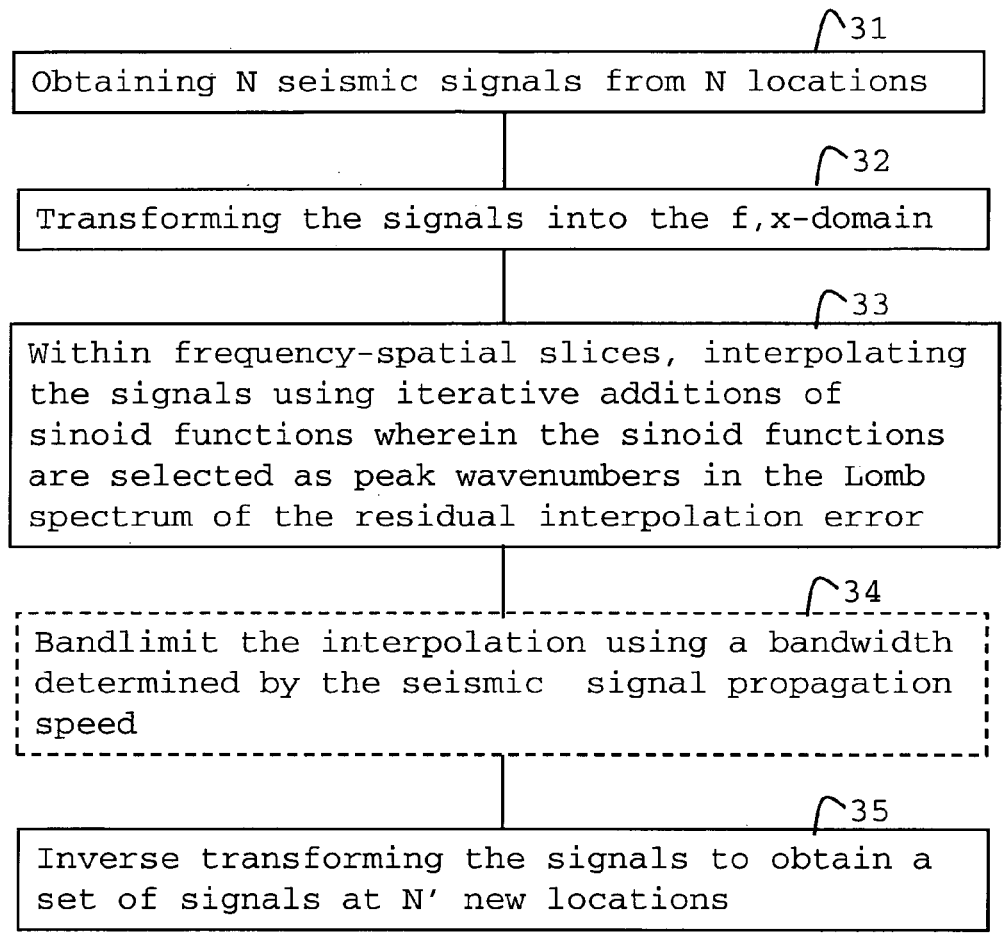
FIG. 3 is a flow chart illustrating steps of an example of invention.

A further example is illustrated in FIGS. 1-3. Data for this example are generated using a seismic model (not shown) but could be equally replaced by signals measured directly in seismic survey. The steps are illustrated in the flow chart of FIG. 3

Figure 1A:
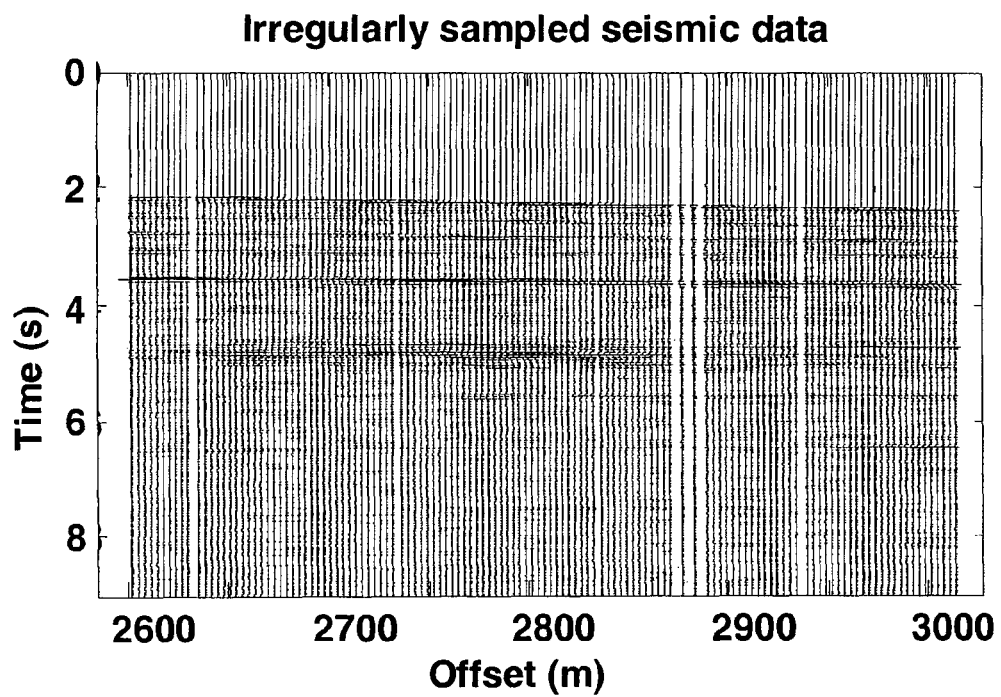
FIGS. 1A and 1B show simulated traces and spacing errors, respectively, of a line of marine seismic sensors.

Initially seismic signals are recording or obtained from a data repository (Step 31 of FIG. 3). In the example, FIG. 1A shows a number of seismic signals or traces as would be recorded by the hydrophones of a seismic marine streamer located between 2600 m and 3000 m offset from a source location. Each hydrophone records signals for about 8 seconds thus generating the traces shown.

Figure 1B:
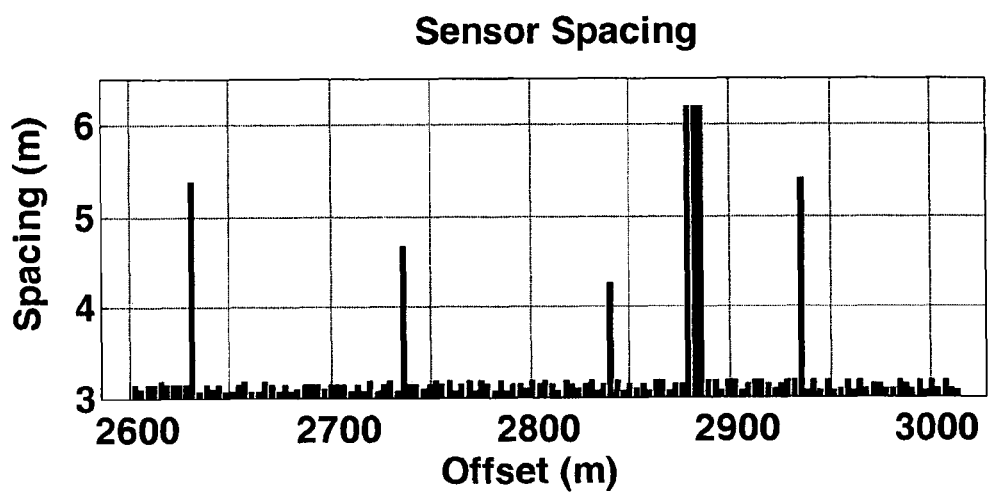

FIG. 1B is the graphic illustration of the spacing errors in a line of seismic sensors. In FIG. 1B, the abscissa denotes the offset of the seismic receiver in meters from a source position and the ordinate denotes the distance to the following sensor in meters. As the graph shows, the sensors at positions 2630 m, 2732 m, 2840 m and 2935 m, have larger gaps of 5.4 m, 4.7 m, 4.2 m and 5.4 m, respectively, in deviation of the nominal distance of about 3 m between receivers. Close to the offset of 2880 a three trace dropout is shown creating gaps larger than 6 m. Some of the gaps shown in FIG. 1B are also clearly visible in FIG. 1A.

The seismic signals are transformed (Step 32) into FX domain by computing the Fourier transformation along the time axis resulting in a set of data as shown in FIGS. 2A and 2B, of which FIG. 2A shows a plot of the data of FIG. 1A transformed into the frequency-space or f,x-domain.

A frequency-spatial slice of the data of FIG. 2A is shown in an enlarged manner in FIG. 2B. The frequency chosen is 60 Hz and the offset range is 2800 m to 2950 m. Following the method of representing these data to be described in greater detail below, this and all other f,x-domain slices are processed independently (Step 33) to obtain a representation of the signals in the f,x-domain.

The regularization step 33 is based on an example of the novel methods in accordance with this invention.

In the new method, the measured seismic signals f(x) are represented as sum of J sinusoids with amplitudes $A_j$, wavenumbers $k_j$ and phases $\phi_j$:

$$f(x) = \sum_{j=1}^{J} A_j \cos(2\pi k_j x + \phi_j). \quad (12)$$

To identify the parameters of the sinusoids, a variant of the Matching Pursuit method is applied. The Matching Pursuit is known per se. See for example S. Mallat and Z. Zhang Mallat "Matching pursuits with time-frequency dictionaries" IEEE Transactions on Signal Processing, vol. 41, no. 12 (1993), 3397-3415. Matching pursuit can be regarded as being an iterative algorithm, which is used in the present example to expand a signal in terms of a linear combination of a set of waveforms.

According to the present example of seismic signals, the set of waveforms used for the Matching Pursuit optimization consists of a set of sinusoids as basis function. However, any family of functions capable of representing the data or signals can be used.

The three parameters frequencies, amplitudes and phases of sinusoids are to be determined iteratively by using the Matching Pursuit method.

Starting with a first representation (which could be in the simplest case a single sinusoidal function or even a constant), a new sinusoid is added at every iteration to the representation and then the error waveform, i.e., the residual, is obtained.

The parameters of the sinusoid added to the representation are found through optimization, for example by minimizing the energy of the residual. Thus, if P−1 components or functions are determined previously, the representation of the seismic data with these P−1 sinusoids is given by $$f^{P-1}(x) = \sum_{j=1}^{P-1} A_j \cos(2\pi k_j x + \phi_j). \quad (13)$$

The residual in the approximation is $$r^{P-1}(x) = f(x) - \sum_{j=1}^{P-1} A_j \cos(2\pi k_j x + \phi_j). \quad (14)$$

If a new term $A_P \cos(2\pi k_P x + \phi_P)$ is added to the existing representation of the signals, then the residual becomes $$r^P(x) = r^{P-1}(x) - A_P \cos(2\pi k_P x + \phi_P). \quad (15)$$

Parameters of the new term are found by minimizing the energy of the residual on L irregular offset locations for example through $$(A_P, k_P, \phi_P) = \arg \min_{(\bar{A}_P, \bar{k}_P, \bar{\phi}_P)} \sum_{k=1}^{L} \left| \frac{r^{P-1}(x_k) -}{\bar{A}_P \cos(2\pi \bar{k}_P x_k + \bar{\phi}_P)} \right|^2 \ldots \quad (16)$$

or any other equivalent cost function known to minimize a residual.

Expressing the new representation term as a sum of a sinoid and a cosinoid $$\bar{A}_P \cos(2\pi \bar{k}_P x_k + \bar{\phi}_P) = \bar{a}_P \cos(2\pi \bar{k}_P x_k) + \bar{b}_P \sin(2\pi \bar{k}_P x_k), \quad (17)$$

where $\bar{a}_P$ and $\bar{b}_P$ defined by $$\bar{A}_P = (\bar{a}_P^2 + \bar{b}_P^2)^{1/2}, \bar{\phi}_P = -\tan^{-1}(\bar{b}_P/\bar{a}_P) \quad (18)$$

then the cost function of eq. (16) becomes linear in $\bar{a}_P$ and $\bar{b}_P$:

$$(a_P, b_P, k_P) = \arg \min_{(\bar{a}_P, \bar{b}_P, \bar{k}_P)} \sum_{k=1}^{L} \left| \frac{r^{P-1}(x_k) -}{\bar{a}_P \cos(2\pi \bar{k}_P x_k) - \bar{b}_P \sin(2\pi \bar{k}_P x_k)} \right|^2. \quad (19)$$

Hence, sinusoid parameters $\bar{a}_P$ and $\bar{b}_P$ which minimizes the above expression can be solved in terms of the wavenumber $\bar{k}_P$ as $$\begin{bmatrix} a_P(\bar{k}_P) \\ b_P(\bar{k}_P) \end{bmatrix} = D_P^{-1}(\bar{k}_P) d_P(\bar{k}_P), \quad (20)$$

where the 2-by-2 matrix $D_P(\bar{k}_P)$ and 2-by-1 vector $d_P(\bar{k}_P)$ are defined as $$D_P(\bar{k}_P) = \begin{bmatrix} \sum_{k=1}^{L} \cos^2(2\pi\bar{k}_P x_k) & \sum_{k=1}^{L} \sin(4\pi\bar{k}_P x_k)/2 \\ \sum_{k=1}^{L} \sin(4\pi\bar{k}_P x_k)/2 & \sum_{k=1}^{L} \sin^2(2\pi\bar{k}_P x_k) \end{bmatrix} \quad (21)$$

$$d_P(\bar{k}_P) = \begin{bmatrix} \sum_{k=1}^{L} r^{P-1}(x_k)\cos(2\pi\bar{k}_P x_k) \\ \sum_{k=1}^{L} r^{P-1}(x_k)\sin(2\pi\bar{k}_P x_k) \end{bmatrix}.$$

in terms of the wavenumber $\bar{k}_P$. Once these optimal values of $\bar{a}_p$ and $\bar{b}_p$ are substituted into (19), the optimization problems simplifies to $$k_P = \underset{\bar{k}_P}{\operatorname{argmin}} \left\{ \sum_{k=1}^{L} |r^{P-1}(x_k)|^2 - d_P^T(\bar{k}_P) D_P^{-1}(\bar{k}_P) d_P(\bar{k}_P) \right\}, \quad (22)$$

which can be alternatively posed as a maximization problem:

$$k_P = \underset{\bar{k}_P}{\operatorname{argmax}} \{ d_P^T(\bar{k}_P) D_P^{-1}(\bar{k}_P) d_P(\bar{k}_P) \}. \quad (23)$$

It can be shown that the objective function $d_P^T(\bar{k}_P) D_P^{-1}(\bar{k}_P) d_P(\bar{k}_P)$ is mathematically equivalent to the so-called Lomb spectrum, which is widely used especially in astronomy to compute the spectrum of non-uniformly sampled time-series. Therefore, the optimal wavenumber $\bar{k}_P$ of the basis functions is effectively estimated by computing the Lomb spectrum and choosing the wavenumber corresponding to the largest peak.

With the optimal wavenumber $\bar{k}_P$ the amplitude and phase of the selected sinusoid is given by solving the respective equations (20) and (18).

Since the Lomb spectrum provides a fairly good estimate of the dominant peak locations, it is conceivable in a variant of this example to estimate not only the maximum but several dominant wavenumbers by the objective function of eq (23) and use these dominant wavenumbers to identify the parameters of several sinusoidal components by using (20). Thus, several sinusoidal functions can be identified at each iteration and the convergence rate of the algorithm may be significantly improved with negligible increase in the computational complexity. As the same dominant wavenumber(s) can be identified as a dominant peak at later iterations, any error introduced by this parallel approach can be corrected at later stages.

The new method is implemented in such a way that it can be extended to handle gradient information. The key step for use of gradient information is that with a representation of the seismic data as given in (12), the gradient of the same data can be represented as:

$$f'(x) = -\sum_{j=1}^{J} A_j 2\pi k_j \sin(2\pi k_j x + \phi_j). \quad (24)$$

When two sets of measurements are available, it is possible to determine the model parameters by minimizing a mixture of fit errors to both sets of measurements. For instance, if the parameters of the sinusoids up to order P−1 are determined, then the parameters of the sinusoid of order P can be determined by minimizing a weighted sum of the residual energies for data and gradient $$(A_P, k_P, \phi_P) = \arg\min_{(\bar{A}_P, \bar{k}_P, \bar{\phi}_P)} \left\{ \sum_{k=1}^{L} \left| \begin{array}{c} r^{P-1}(x_k) - \\ \bar{A}_P \cos \\ (2\pi\bar{k}_P x_k + \bar{\phi}_P) \end{array} \right|^2 + \lambda \sum_{k=1}^{L} \left| \begin{array}{c} (r^{P-1})'(x_k) + \\ \bar{A}_P 2\pi\bar{k}_P \sin \\ (2\pi\bar{k}_P x_k + \bar{\phi}_P) \end{array} \right|^2 \right\}, \quad (25)$$

where $\bar{A}_P \cos(2\pi\bar{k}_P x_k + \bar{\phi}_P)$ is the new term or function added to the representation, $(r^{P-1})'(x)$ is the gradient of the residual given in (14) and $\lambda$ is weighting parameter which also accounts for difference of units between data and gradient measurements. If the new model term is expressed as shown in equation (17), then the model parameters $\bar{a}_p$ and $\bar{b}_p$ are obtained as $$\begin{bmatrix} a_P(\bar{k}_P) \\ b_P(\bar{k}_P) \end{bmatrix} = (D_P(\bar{k}_P) + \lambda G_P(\bar{k}_P))^{-1} (d_P(\bar{k}_P) + \lambda g_P(\bar{k}_P)), \quad (26)$$

where $D_P(\bar{k}_P), d_P(\bar{k}_P)$ are given in (21) and $G_P(\bar{k}_P), g_P(\bar{k}_P)$ are defined as $$G_P(\bar{k}_P) = \begin{bmatrix} 4\pi^2 \bar{k}_P^2 \sum_{k=1}^{L} \sin^2(2\pi\bar{k}_P x_k) & -2\pi^2 \bar{k}_P^2 \sum_{k=1}^{L} \sin(4\pi\bar{k}_P x_k) \\ -2\pi^2 \bar{k}_P^2 \sum_{k=1}^{L} \sin(4\pi\bar{k}_P x_k) & 4\pi^2 \bar{k}_P^2 \sum_{k=1}^{L} \cos^2(2\pi\bar{k}_P x_k) \end{bmatrix} \quad (27)$$

$$g_P(\bar{k}_P) = \begin{bmatrix} -2\pi\bar{k}_P \sum_{k=1}^{L} (r^{P-1})'(x_k) \sin(2\pi\bar{k}_P x_k) \\ 2\pi\bar{k}_P \sum_{k=1}^{L} (r^{P-1})'(x_k) \cos(2\pi\bar{k}_P x_k) \end{bmatrix}.$$

in terms of the wavenumber $\bar{k}_P$. Thus substituting $\bar{a}_p$ and $\bar{b}_p$ into (25) and simplifying the resulting equation, the 3-dimensional minimization problem in (25) can be transformed into a 1-Dimensional maximization problem:

$$k_P = \underset{\bar{k}_P}{\operatorname{argmax}} \left\{ \begin{array}{c} (d_P(\bar{k}_P) + \lambda g_P(\bar{k}_P))^T (D_P(\bar{k}_P) + \\ \lambda G_P(\bar{k}_P))^{-1} (d_P(\bar{k}_P) + \lambda g_P(\bar{k}_P)) \end{array} \right\}. \quad (28)$$

This problem is non-linear in $\bar{k}_P$. Therefore, the wavenumber domain is searched to find the optimal $\bar{k}_P$. It is worth noting that computation of the objective function given in (28) has the same order of complexity as that a for non-uniform Fourier transform.

At each iteration, the convergence speed of the algorithm can be increased by determining more than one dominant wavenumbers from eq. (28) and the corresponding function parameters from eq. (26).

By using an inverse Fourier transformation (Step 35), a time, space or t,x-domain representation of the regularized signal can be obtained.

To increase the efficiency of the method, it is beneficial to apply it with different spatial bandwidths for different frequency slices (Step 34). This spatial bandwidth can be regarded (and implemented) as a low-pass filter in the k- or wavenumber-domain.

As shown in FIG. 2C. the method can be accelerated by using in the example of the slice around 60 Hz a spatial bandwidth limited to +/−k1 rather than the full bandwidth +/−k0. Whilst the latter limit is usually determined by the Nyquist limit or any data decimation applied, the bandwidth +/−k1 is determined be the propagation speed c of the seismic signal and varies with frequency between 0 and +/−k0 according to the relationship f/c as shown. The signals with relevance to the seismic data processing are confined within the hatched area 21. The Nyquist wavenumber is different for each frequency slice of the FX data. This information is used to increase the accuracy and speed of the interpolation.

For marine seismic signals the speed c can be taken to be close to 1500 m/s. The speed c varies depending on environmental conditions (temperature, salt content, etc.) For land and transition zone acquisitions, an even larger variation in c can be found.

Figure 4A:
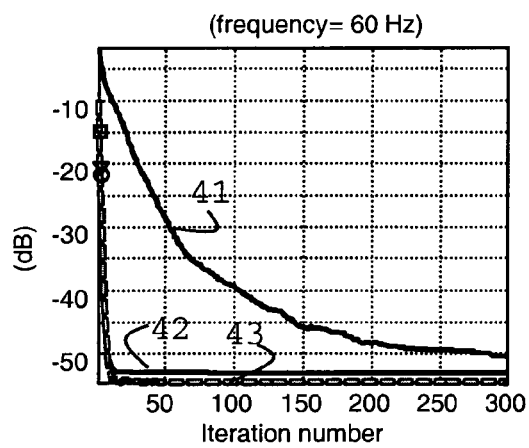
FIGS. 4A and 4B compare examples of the novel methods with the prior art.
Figure 4B:
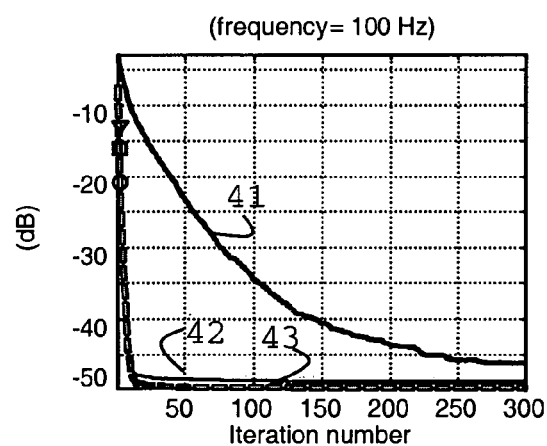

The convergence rates of the known regularization or interpolation techniques and the interpolation in accordance with the above example is compared with the results of the comparison shown in FIG. 4 for two different frequencies (60 Hz and 100 Hz). In FIG. 4 the interpolation error (or residual) in dB is shown in accordance with the number of iterations.

Since the nearest neighbour (indicated by a trianglar symbol in FIG. 4, sin c (square symbol), and Yen-1 type methods (circle) are non-iterative, they are shown to have converged at the $1^{st}$ iteration, with the error levels as indicated. For the known ALFT method as referred to above, the interpolation error 41 calculated on regular samples reaches a plateau at about 300 iterations.

On the other hand, the new method (line 42) requires only about 10 iterations to converge. Furthermore, the interpolation error at convergence is lower than those of ALFT or the non-iterative methods. Considering that the computational complexity per iteration of the new method is comparable to that of the ALFT method, it is clear that the new method appears to be superior to ALFT method in terms of both speed and accuracy. The use of multi-channel signals results (dashed line 43) in an even lower level of errors (dashed line 43) at approximately the same convergence rate as the new method.

The invention claimed is:

1. A method for seismic surveying, the method comprising the steps of:
    performing a seismic survey using one or more seismic sources, wherein performing the seismic survey comprises using a plurality of seismic receivers disposed at a plurality of irregularly spaced locations to record multichannel seismic data generated by the one or more seismic sources, wherein the plurality of seismic receivers measure seismic signals at the plurality of irregularly spaced locations and the plurality of irregularly spaced locations comprise discrete points spread in space and/or time, and wherein the measured seismic signals comprise a time series of waves and the multichannel seismic data comprises the measured seismic signals and a first order derivative of the measured seismic signals;
    receiving the multichannel seismic data from the plurality of seismic receivers;
    using a processor to regularize the received multichannel seismic data, wherein the processor executes a series of instructions stored thereon, the instructions comprising:
        selecting a set of iterative basis functions to model said multichannel seismic data, wherein each of the set of iterative basis functions is fully defined by n unknown parameters;
        producing a representative model of the multichannel seismic data by iteratively estimating the n unknown parameters, wherein the step of producing the representative model of the multichannel seismic data, comprises:
            (a) applying an estimate of the n unknown parameters to each of the set of iterative basis functions;
            (b) combining results of the application of the estimate of the n unknown parameters to each of the set of iterative basis functions to produce an iterative representative model of the multichannel seismic data;
            (c) comparing the iterative representative model of the multichannel seismic data with the measured seismic signals and the derivatives of the measured seismic signals at said discrete points;
            (d) adjusting the estimate of the n unknown parameters and repeating steps (a), (b) and (c) until a difference between the iterative representative model of the multichannel seismic data and the measured seismic signals and the derivatives of the measured seismic signals at said discrete points is minimized; and
            (e) determining the representative model of the measured seismic signals from the set of iterative basis functions and values of the adjusted n unknown parameters when the difference between the iterative representative model of the multichannel seismic data and the measured seismic signals and the derivatives of the measured seismic signals at said discrete points is minimized;
        transforming the multichannel seismic data received from the plurality of seismic receivers disposed at the plurality of irregularly spaced locations in the seismic survey into regularized seismic signals, wherein the transforming of the multichannel seismic data from the seismic survey to regularized seismic signals comprises using the representative model of the multichannel seismic data to regularize the measured seismic signals by interpolating values for the measured seismic signals at regularized positions; and
        using the regularized seismic signals to obtain an image of a subsurface of the Earth.

2. The method of claim 1, wherein each of said n unknown parameters is selected using an optimization process.

3. The method of claim 2, wherein the optimization process is independent of a relative distance between the plurality of irregularly spaced locations.

4. The method of claim 1, wherein the iterative basis functions are selected by simultaneously optimizing the n unknown parameters.

5. The method of claim 1, wherein the n unknown parameters represent amplitude, phase and frequency.

6. The method of claim 5, wherein optimized values of the n unknown parameters comprise functions of one of the amplitude, the phase and the frequency.

7. The method of claim 5, wherein optimized values of the n unknown parameters representing amplitude, phase and frequency are represented as functions of the frequency or wavenumber.

8. The method of claim 1, wherein the n unknown parameters are determined from a choice of a maximum in a Lomb spectrum.

9. The method of claim 1, wherein the iterative basis functions comprise sinusoids.

10. The method of claim 1, wherein the measured seismic signals comprise wave energy or reflections of the wave energy that has traveled through layers of the earth.

11. The method of claim 1, wherein a highest frequency of the seismic signals is below 500 Hz.

12. The method of claim 1, wherein the measured seismic signals comprise a frequency content range between 0 and 500 Hz.

13. The method of claim 1, wherein the measured seismic signals are split in to a plurality of frequency bands and the measured seismic signals are regularized for each of the plurality of frequency bands separately.

14. The method of claim 13, wherein different spatial bandwidths are used in each of the plurality of frequency bands to produce the representative model of the multichannel seismic data.

15. The method of claim 14, wherein the different spatial bandwidths are determined from a speed of propagation of the seismic signals.

16. The method of claim 1, further comprising the step of deriving a spectrum of the measured seismic signals from the selected iterative basis functions.

17. The method of claim 1, wherein the measured seismic signals are measured in a two dimensional (2D) spatial plane.

18. The method of claim 1 wherein the measured seismic signals are measured in a three dimensional (3D) spatial plane.

19. The method of claim 1, wherein the measured seismic signals and gradients of the measured seismic signals are regularized simultaneously.

20. The method of claim 1, wherein the signals and gradients of the seismic signals are regularized in a temporal-spatial (t,x) domain.

* * * * *